United States Patent [19]

Mikowski

[11] Patent Number: 5,690,550
[45] Date of Patent: Nov. 25, 1997

[54] DIFFUSER OUTLET ASSEMBLY

[75] Inventor: Michael Stephen Mikowski, Lake Leelanau, Mich.

[73] Assignee: Manchester Plastics, Inc., Troy, Mich.

[21] Appl. No.: 637,051

[22] Filed: Apr. 24, 1996

[51] Int. Cl.[6] .................................................. B60H 1/34
[52] U.S. Cl. ............................ 454/155; 454/315; 454/320
[58] Field of Search ................................. 454/144, 155, 454/202, 313, 315, 316, 319, 320

[56] References Cited

U.S. PATENT DOCUMENTS

| | | |
|---|---|---|
| 3,552,295 | 1/1971 | Armstrong . |
| 4,665,804 | 5/1987 | Miyasaka . |
| 5,186,387 | 2/1993 | Doi et al. . |
| 5,188,561 | 2/1993 | Nissimoff et al. . |
| 5,230,654 | 7/1993 | Bloomer . |
| 5,238,448 | 8/1993 | Komori et al. . |
| 5,338,252 | 8/1994 | Bowler et al. . |
| 5,340,357 | 8/1994 | Nagai et al. . |
| 5,364,303 | 11/1994 | Terry ........................... 454/155 |
| 5,393,262 | 2/1995 | Hashimoto et al. . |
| 5,470,276 | 11/1995 | Burnell et al. ................. 454/155 |
| 5,520,579 | 5/1996 | Saida .......................... 454/155 |

FOREIGN PATENT DOCUMENTS 61-86529  5/1986  Japan ....................... 454/155

*Primary Examiner*—Harold Joyce
*Attorney, Agent, or Firm*—Bliss McGlynn, P.C.

[57] ABSTRACT

The outlet assembly (10) includes a barrel housing (16) pivotally supported along a horizontal axis. The barrel housing (16) supports a control housing (28) fixedly therein. The control housing (28) pivotally supports a plurality of louvers (34) therein. A link control plate (38) is operatively connected to the louvers (34) and slidable with respect to the control housing (28). The link plate (38) is moved outwardly to allow operation of the louvers (34) in parallel with one another, and is moved inwardly to spread the louvers (34) to cause diffusion of the air.

19 Claims, 3 Drawing Sheets

DIFFUSER OUTLET ASSEMBLY

BACKGROUND OF THE INVENTION

1. Field of the Invention

The present invention relates to outlet or ventilating assemblies for directing air in a plurality of directions, and particularly, as used in vehicles.

2. Description of the Related Art

There are various designs of air outlet assemblies which redirect air from an air duct to a plurality of directions as desired and controlled by the user. Such designs have been commonly used in vehicles, along with various other applications for ventilation. Some such outlet assemblies act in two modes: parallel mode (typical operation) where the vanes are moved parallel with respect to one another to direct air in a single direction, and diffused mode wherein the vanes are spread outwardly from one another to direct air in all directions.

Representative of such assemblies is U.S. Pat. No. 5,230, 654 issued Jul. 27, 1993 in the name of Bloomer. The patent discloses a diffuser outlet wherein each vertical vane contains two pivotal vane groups that are independently pivotable about there coaxes. Each of the two vane groups are connected to separate actuator bars. The vane groups move between the parallel, aligned position and the diffused position. In the parallel position, the vane groups are aligned with respect to each other. A control actuator may be pushed to cause the vane groups to spread and separate by forcing the actuator bars in opposite outward directions in the diffused position.

U.S. Pat. No. 5,470,276 issued Nov. 28, 1995 in name of Burnell et al. discloses an air diffuser outlet which discloses three different embodiments. In general, plates or links are utilized to move the vanes and plates sideways, outwardly or which are pulled toward one another for the diffused position of the vanes. The links or plates only move sideways.

U.S. Pat. No. 5,364,303 issued Nov. 15, 1994 in the name of Terry discloses a push button connected to two pairs of linkages which are connected to the rear side of the vanes or louvers. When the push button is pulled out, the links are drawn together thereby causing movement to the diffused position. When the push button is pushed in, the links are pushed apart causing the vanes to align in a parallel orientation.

SUMMARY OF THE INVENTION

The invention includes an air outlet assembly for directing air in a plurality of directions. The assembly comprises a housing, and a plurality of louvers each having first and second ends pivotally connected to the housing. Also included is a link control plate slideably connected to at least one of the plurality of louvers for sliding movement along the control axis and for sliding with respect to the housing along the control axis. A guide is operatively connected between the housing and the link control plate establishing a first position to allow the louvers to pivot parallel with one another and a second position spaced from the first position along the first axis to spread the louvers outwardly to diffuse the air.

BRIEF DESCRIPTION OF THE DRAWINGS

Advantages of the subject invention will be readily appreciated as the same becomes better understood by reference to the following detailed description when considered with the accompanying drawings wherein.

DESCRIPTION OF THE PREFERRED EMBODIMENT(S)

Figure 1:
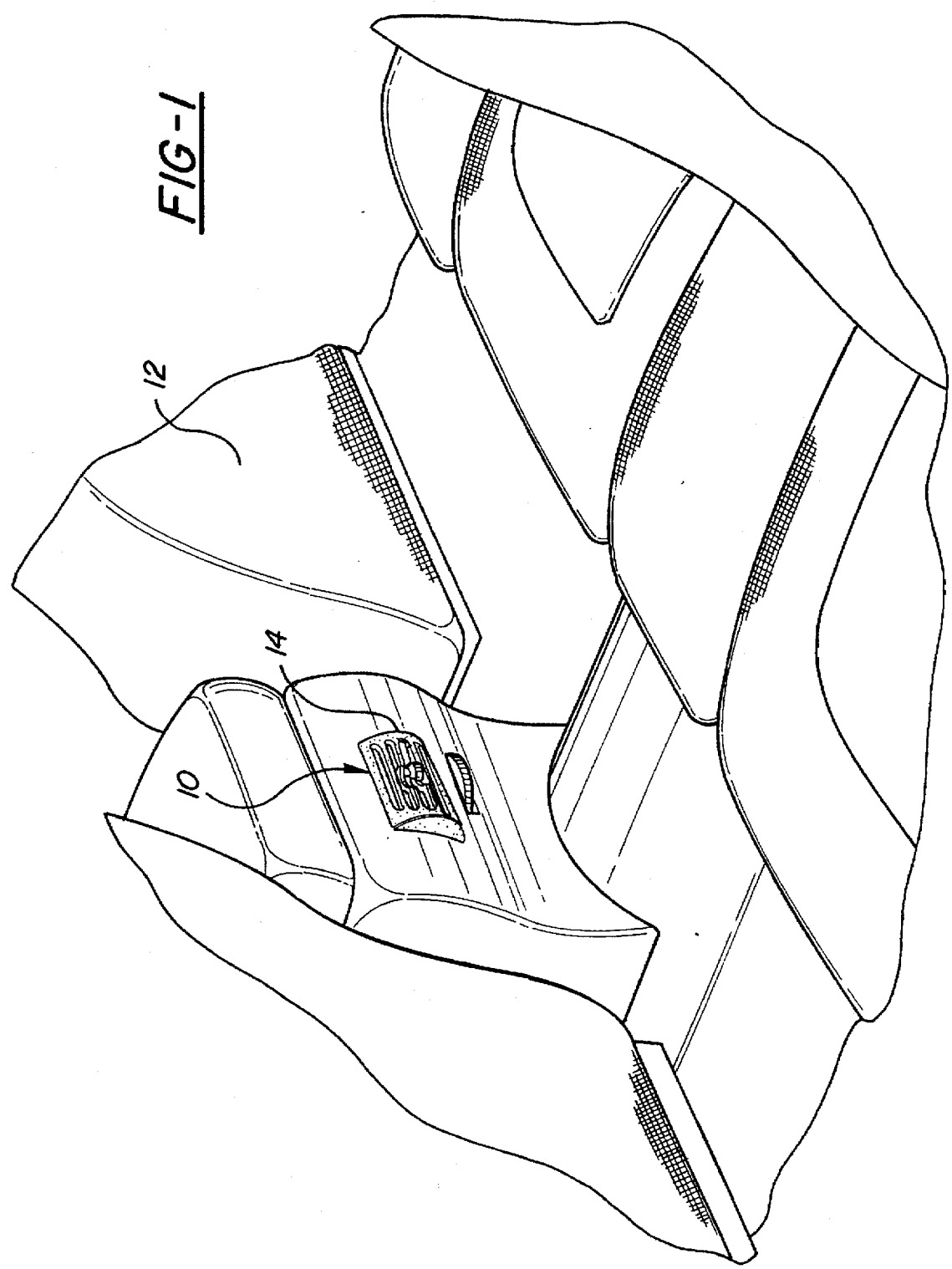
FIG. 1 is a general perspective view of the outlet assembly as used in a vehicle.
Figure 2:
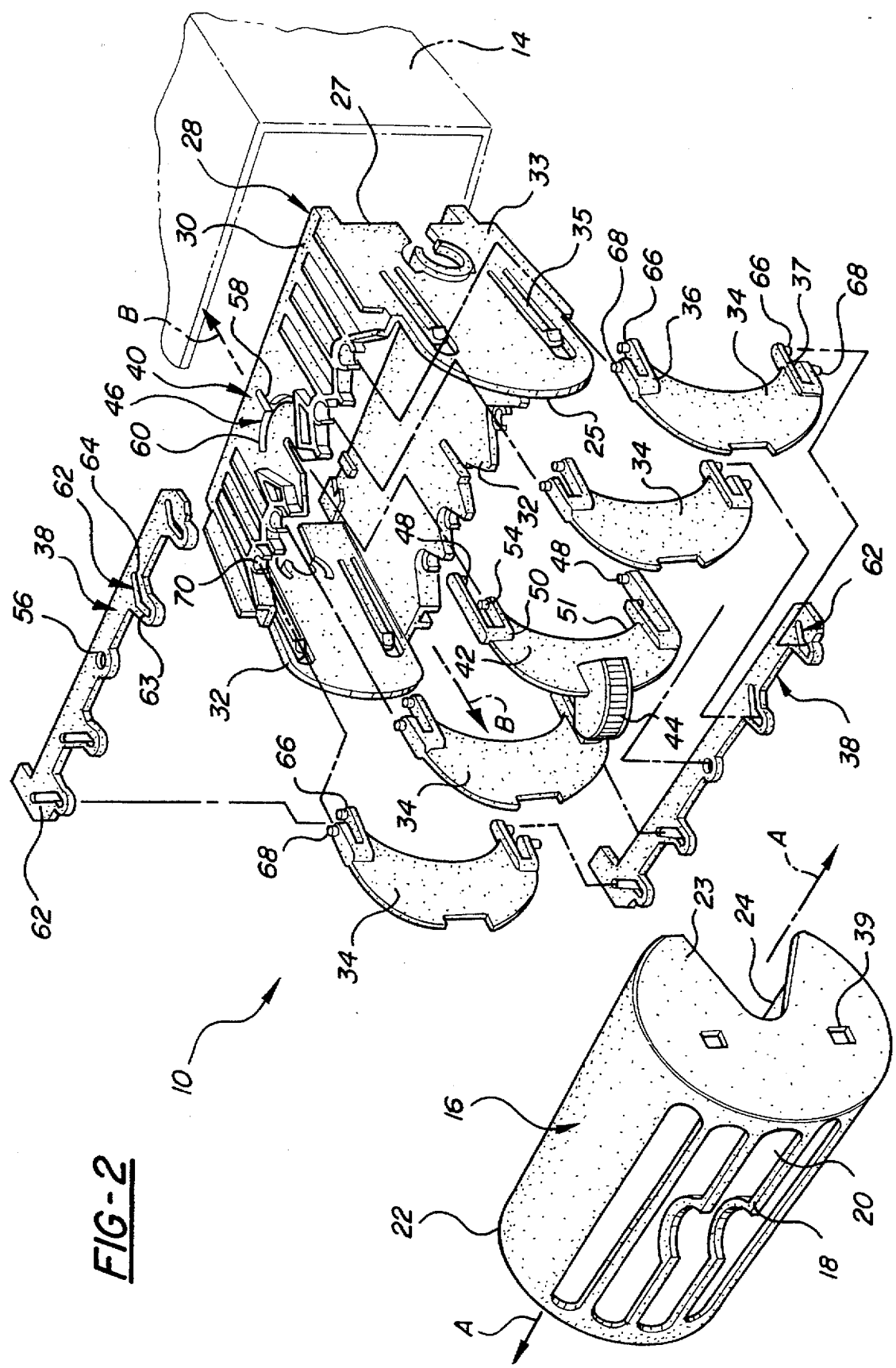
FIG. 2 is an exploded perspective view of the subject invention.

An air outlet assembly is generally illustrated at 10 in FIG. 1, and more specifically in FIG. 2. The air outlet assembly 10 allows redirection of air flowing therethrough to a plurality of directions as selected by the user. FIG. 1 illustrates the assembly 10 as used in a vehicle 12. However, it is to be appreciated that the outlet assembly 10 may be utilized in variety of applications for redirecting air.

The outlet assembly 10 includes an outlet housing 14 formed either by a portion of the vehicle 12 or by a separate housing which is supported in the vehicle 12. The outlet housing 14 typically establishes an air duct for allowing air to flow therethrough. The outlet housing 14 pivotally supports a barrel housing 16 therein. The barrel housing 16 pivots about a horizontal barrel axis A. The barrel housing 16 includes a plurality of vanes 18 extending across an outlet opening 20 of the barrel housing 16. The barrel housing 16 is generally cylindrical in shape having first and second barrel ends 22,23. The barrel housing 16 includes an open inlet 24 and the outlet opening 20, both extending along the longitudinal length of the cylinder and opposing one another on either sides of the cylindrical barrel housing 16. The vanes 18 are generally planar in configuration such that when the barrel housing 16 is pivoted upward and downward, the vanes 18 can redirect air passing through the barrel housing 16 in the desired direction.

The outlet assembly 10 includes a control housing 28 fixedly connected to the barrel housing 16. The control housing 28 is generally rectangular in shape having open sides 25,27 allowing air to flow therethrough between upper and lower sides 30,32. The open sides 25,27 align with and are adjacent the inlet and outlet barrel openings 24,20, respectively, of the barrel housing 16. In the preferred embodiment, the control housing 28 slides within the barrel housing 16 and includes first and second control ends 32,33 which interlock and engage the first and second barrel ends 22,23. As best illustrated in FIG. 2, the first and second control ends 32,33 includes flexible fingers 35 extending therefrom which engage in notches or apertures 39 in the first and second barrel ends 22,23. This allows for a snap fit of the control housing 28 within the barrel housing 16. The control housing 28 also includes pivot receptacles 26 to receive pivot pins (not shown) extending from the output housing 14 to support the control housing 28 and barrel housing 16 in pivotal relationship thereto.

The assembly 10 also includes a plurality of louvers 34 each having first and second louver ends 36,37 pivotally connected to the control housing 28. Also included is at least one link control plate 38 slideably connected to at least one of the plurality of louvers 34 for sliding movement along a control axis B and slidable with respect to the control housing 28 along the control axis B. The control axis B extends inward and outward of the assembly 10, i.e., along the air flow direction. In the preferred embodiment, there are a pair of link control plates 38 positioned on opposite ends 36,37 of the louvers 34, and each of the louvers 34 are slideably connected to the plates 38.

Also included is a guide 40 operatively connected between the control housing 28 and the link control plate 38 providing a first position to allow the louvers to pivot in parallel with one another during a parallel mode of operation and a second position spaced from the first position along the control axis to spread outwardly the louvers 34 in a diffused mode of operation. This construction will be further discussed subsequently.

The assembly 10 also includes a control louver 42 positioned between the plurality of louvers 34 and operatively connected with the guide 40 for controlling the assembly 10 between the diffused mode and the parallel mode of operations. In the preferred embodiment, the control louver 42 is centered within the plurality of louvers 34. As illustrated, there are four general louvers 34, two on each side of the control louver 42. The control louver 42 includes a knob 44 extending therefrom to allow the user to access the control louver 42 and easily move the assembly between the diffused and parallel modes of operation.

The guide 40 includes a guide channel 46 formed in one of the control housing 28 and the control louver 42, and a guide pin 48 formed in the other of the control louver 42 and control housing 28. The guide channel 46 extends between the first and second positions along the control axis B. In the preferred embodiment, guide pins 48 are fixedly connected on first and second ends 50,51 of the control louver 42. The control housing 28 includes guide channels 46 formed in each of the upper and lower sides 30,32 therein to receive the guide pins 48 in sliding relation thereto. The control louver 42 is fixedly and pivotally connected to the link control plates 38 to allow sliding of the control louver 42 and the link control plates 38 with respect to the control housing 28. In the preferred embodiment, the control louver 42 includes pivot pins 54 extending from the first and second ends 50,51 of the control louver 42 to be engaged in apertures 56 located in the center portion of the link control plates 38. The pivot pins 54 are located outwardly of the guide pin 48 with respect to the assembly 10 and along control axis B. Therefore, as the control louver 42 moves through the guide channel 46 along the control axis B, it can be appreciated that the link control plates 38 also moves with the control louver 42.

The guide channels 46 include an elongated axis channel 58 extending along the control axis B to move the assembly 10 between the parallel mode and the diffused mode. The guide channel 46 also includes an arcuate channel 60 transverse to the axis channel 58 to allow movement of the louvers 34 and link control plate 38 in the parallel mode. In the first position, the guide pin 48 of the control louver 42 is positioned in the arcuate channel 60. In the second position for diffused mode of operation, the guide pin 48 of the control louver 42 is positioned on the most inward end of the axis channel 58 spaced from the arcuate channel 60.

The link control plates 38 include a plurality of bent channel 62 formed therein and extending between two channel ends 63,64 providing the first and second positions. The plurality of louvers 34 each include guide pins 66 extending from the first and second louver ends 36,37 which engage the bent channels 62 in sliding relationship. In the parallel mode of operation, the pin 66 are positioned in the inward most position, i.e. the first position of the channel end 63. In the diffused mode of operation, the link control plate 38 is slid rearwardly further into the control housing 28 which, through use of the bent channel 62 allows the louvers 34 to be spread and angled outwardly. In this position, the pins 66 are moved to the second position of the channel ends 64. The louvers 34 also include pivot pins 68 which are fixedly and pivotally connected within receptacles 70 of the control housing 28. The guide pins 66 of the louvers 34 are positioned inwardly of the pivot pins 68 (see FIGS. 3–4).

Figure 3:
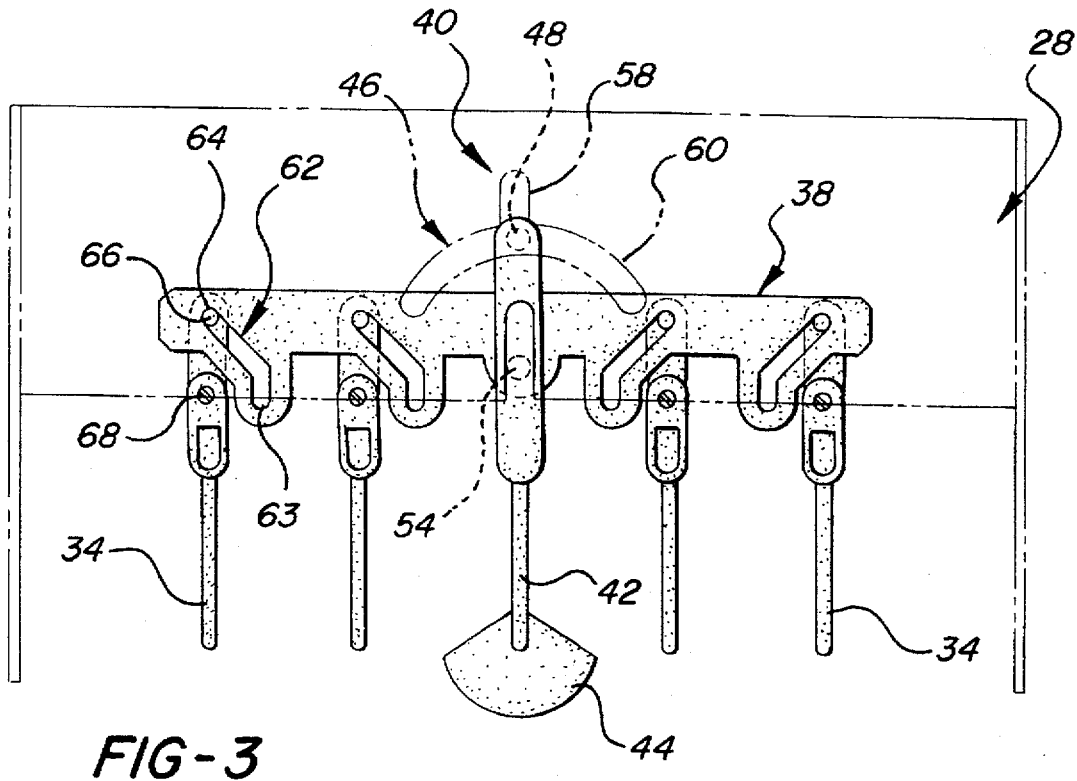
FIG. 3 is a plan view showing the control plate in the parallel position.
Figure 4:
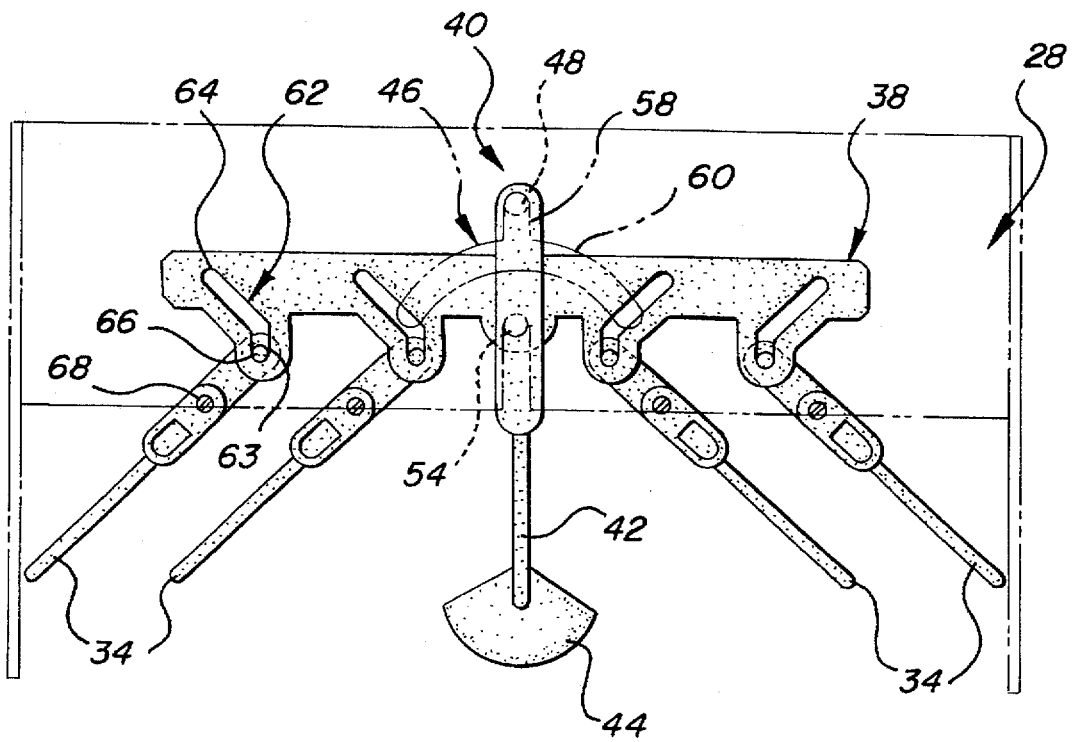
FIG. 4 is a plan view showing the control plate in the diffused mode.

In operation, the outlet assembly 10 may initially be in its first position or parallel mode of operation as illustrated in FIG. 3. In this position, the knob 44 may be actuated to move the barrel housing 16 upward and downward, and also move the louvers 34,42 side to side, in parallel, to concentrate the air in a single direction. It can be seen, movement of the knob 44 side to side causes pivoting movement of the control louver 44 about its pivot pins 54, which in turn causes the guide pin 48 to move within the arcuate channel 60, which causes the link control plates 38 to move side to side. This side to side movement of the control plates 38 causes the remaining louvers 34 to move in parallel with the control louver 42 and pivot about their pivot pins 68.

When the diffused mode of operation is to be utilized, the outlet assembly 10 is moved to its straight on position, i.e. the control louver 42 is moved to its center position or perpendicular position with respect to the assembly 10. Once in this position, the knob 44 is pushed inwardly which causes the guide pin 44 to slide back within the axis channel 58 to the second end 64 thereof. Upon this movement, the link control plates 38 move with the control louver 42 in a backward direction, which cause the louver pins 34 to slide along the bent channel 62, which in turn causes the louvers 34 to be spread and angled outwardly to redirect air in outward directions.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An air outlet assembly for directing air in a plurality of directions, said assembly comprising:

a housing having an inlet and outlet and establishing a central axis extending in a direction from said inlet to said outlet:

a plurality of directional louvers and a control louver each having first and second ends and pivotally connected to said housing;

a link control plate slidably connected to said plurality of directional louvers, said link control plate including an elongated member substantially perpendicular to said control axis for sliding movement along said control axis with respect to said housing while remaining perpendicular with said control axis; and a guide operatively connected between said housing and said link control plate establishing a first position to allow said louvers to pivot in parallel with one another in a parallel mode of operation and a second position spaced from said first position along said control axis to spread said louvers outwardly in a diffused mode of operation.

2. An assembly as set forth in claim 1 wherein said control louver is operatively connected with said guide.

3. An assembly as set forth in claim 2 wherein said guide includes a guide channel formed in one of said housing and said control louver and a guide pin formed in the other of said control louver and said housing, said guide channel extending between said first and second positions along said control axis.

4. An assembly as set forth in claim 3 wherein said control louver is fixedly and pivotally connected with said link control plate to allow sliding of said control louver and said link control plate with respect to said housing.

5. An assembly as set forth in claim 4 further including a second link control plate spaced from and parrallel with said link control plate, said second link control plate substantially indentical to said link control plate and slidably connected to said directional louvers.

6. An assembly as set forth in claim 4 wherein said housing comprises a control housing, and further including a barrel housing fixedly supporting said control housing.

7. An assembly as set forth in claim 6 further including an outlet housing pivotally supporting said barrel housing therein.

8. An assembly as set forth in claim 7 wherein said barrel housing includes a plurality of vanes extending across an opening thereof.

9. An assembly as set forth in claim 4 wherein said link control plate includes a plurality of bent channels formed therein having two channel ends providing said first and second positions, said plurality of directional louvers including pins extending into said bent channels.

10. An assembly as set forth in claim 4 wherein said guide channel includes an elongated axis channel extending along said first axis to allow said louvers to move between said plarallel mode and said diffused mode, and an arcuate channel transverse to said axis channel to allow movement of said louvers and link control plate parallel mode.

11. An air outlet assembly for directing air in a plurality of directions, said assembly comprising;
   a housing;
   a plurality of directional louvers and a control louver each having first and second ends and pivotally connected to said housing;
   a unitary link control plate of fixed shape slidably connected to each of said plurality of directional louvers for sliding movement along a control axis and slidable with respect to said housing; and
   a guide operatively connected between said housing and said link control plate establishing a first position to allow said louvers to pivot in parallel with one another in a parallel mode of operation and a second position spaced from said first position along said control axis to spread said louvers outwardly in a diffused mode of operation.

12. An assembly as set forth in claim 11 further including a control louver operatively connected with said guide.

13. An assembly as set forth in claim 12 wherein said guide includes a guide channel formed in one of said housing and said control louver and a guide pin formed in the other of said control louver and said housing, said guide channel extending between said first and second positions along said control axis.

14. An assembly as set forth in claim 13 wherein said control louver is fixedly and pivotally connected with said link control plate to allow sliding of said control louver and said link control plate with respect to said housing.

15. An assembly as set forth in claim 14 wherein said link control plate includes a plurality of bent channels formed therein having two channel ends providing said first and second positions, said plurality of directional louvers including pins extending into said bent channels.

16. An assembly as set forth in claim 15 wherein said guide channel includes an elongated axis channel extending along said first axis to move between parallel mode and diffused mode, and an arcuate channel transverse to said axis channel to allow movement of said louvers and link control plate in parallel mode.

17. An air outlet assembly for directing air in a plurality of directions, said assembly comprising:
   a housing;
   a plurality of directional louvers and a control louver, each having first and second ends and being pivotally connected to said housing;
   a link control plate slidably connected to each of said plurality of directional louvers for sliding movement along a control axis and slidable with respect to said housing along said control axis;
   a guide operatively connected between said housing and said link control plate establishing a first position to allow said louvers to pivot in parallel with one another in a parallel mode of operation and a second position spaced from said first position along said control axis to spread said louvers outwardly in a diffused mode of operation;
   one of said link control plate and said directional louvers including a bent channel having two channel ends providing said first and second positions, the other of said link control plate and said directional louvers including a pin extending into said bent channel providing each slidable interconnection between said link control plate and said directional louvers.

18. An assembly as set froth in claim 17 wherein said link control plate includes said plurality of bent channels formed therein, said plurality of directional louvers including said pins extending into said bent channels.

19. An assembly as set forth in claim 18 wherein said guide channel includes an elongated axis channel extending along said first axis to move between parallel mode and diffused mode, and an arcuate channel transverse to said axis channel to allow movement of said louvers and link control plate in parallel mode.

* * * * *

UNITED STATES PATENT AND TRADEMARK OFFICE
CERTIFICATE OF CORRECTION

PATENT NO. : 5,690,550
DATED : November 25, 1997
INVENTOR(S) : Michael S. Mikowski It is certified that error appears in the above-indentified patent and that said Letters Patent is hereby corrected as shown below:

Column 4, line 22, "44", should be -- 48 --.

Column 5, Claim 10, line 6, after "plate", insert -- in --.

Signed and Sealed this

Tenth Day of February, 1998

Attest:

BRUCE LEHMAN

Attesting Officer

Commissioner of Patents and Trademarks